J. J. CAMPBELL.
WELDING TOOL.
APPLICATION FILED JAN. 29, 1919.
1,306,746.
Patented June 17, 1919.
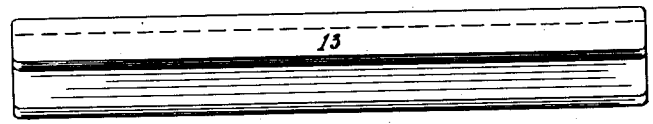
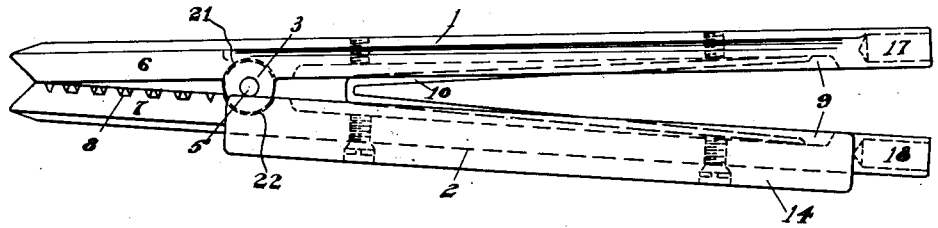
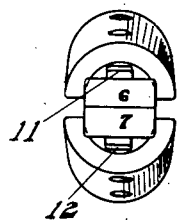
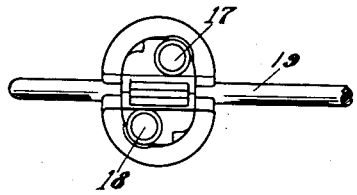
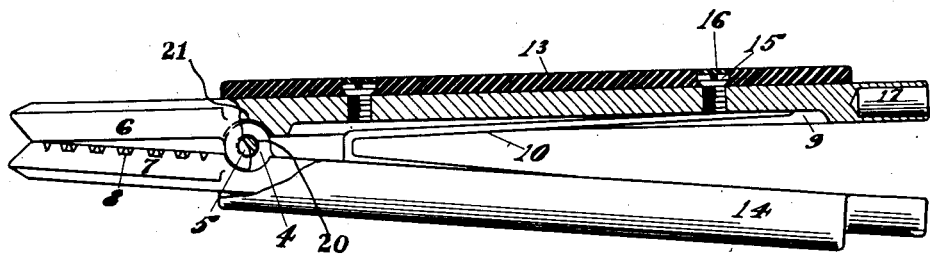
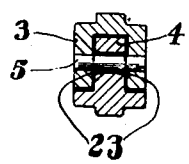
INVENTOR
JOHN J. CAMPBELL
BY
Albion D. T. Libby
ATTORNEY

UNITED STATES PATENT OFFICE.

JOHN J. CAMPBELL, OF BROOKLYN, NEW YORK.

WELDING-TOOL.

1,306,746.  Specification of Letters Patent.  Patented June 17, 1919.

Application filed January 29, 1919. Serial No. 273,811.

*To all whom it may concern:*

Be it known that I, JOHN J. CAMPBELL, a citizen of the United States, residing in Brooklyn, in the county of Kings and State of New York, have invented certain new and useful Improvements in Welding-Tools, of which the following is a specification.

This invention relates to a tool used in connection with electric arc welding in which one electrode is the material to be cut, welded or repaired, and the other electrode is the cutting, welding or repair material. In electric arc welding it has become the general practice to use metal electrodes and in order to connect this electrode into the welding circuit some means must be provided for holding the electrode in such a manner that it may be operated in an easy and efficient manner in coöperation with the stationary electrode.

Inasmuch as the electrode holder or welding tool is usually hand operated it should possess certain features which may be briefly enumerated as follows:—

It should grip the electrode firmly when pressure on the hand part is released.

That portion of the electrode held in the jaws of the welding tool after the electrode has been welded down should be quickly released by squeezing or exerting pressure on the handle portion, thereby speeding up the welding operation.

The welding tool should never get detrimentally hot, due to the current passing through its members or from the heat transmitted to its jaws through the electrode.

The welding tool should be the right weight and should carry the electrical conductors bringing the current to the tool in such a manner as to make their presence unfelt.

The tool should be made to stand hard usage and consequently should last for years.

The tool should have the ability to grip different size electrodes with the same opening of the jaws, which feature is advantageous so that the operator's hand grips the handle in substantially the same manner when different sizes of electrodes are used.

The tool should have a maximum area of contact at different angles at which the electrode may be placed within the jaws.

It is the general object of my invention to provide a welding tool which possesses all of the above features together with others which will be apparent to one skilled in the art.

The preferred form of my invention is illustrated in the accompanying drawing, wherein Figure 1 is a longitudinal view of the welding tool with one of the handle insulating strips removed.

Fig. 2 is a view of the insulating strip as removed from one of the members illustrated in Fig. 1.

Fig. 3 is a left hand end view of Fig. 1, but with the insulating strip of Fig. 2 in position thereon.

Fig. 4 is a right hand end view of Fig. 1 in complete assembled position and with a portion of an electrode in the jaws.

Fig. 5 is a longitudinal view of the welding tool with one of the members in part section, showing particularly the pivoting arrangement.

Fig. 6 shows an alternative construction of the hole through the lug on one of the members.

Referring now particularly to the details, wherein like numbers refer to corresponding parts in the various views, 1 and 2 are two metal members preferably of fair electrical conductivity, such as manganese bronze. One of the members, such as 1, has two ears 3, one of which is shown in Fig. 1, between which a lug 4 on member 2 is positioned. A pivot pin 5 passes through both ears 3 and the lug 4. The hole for the pin 5 in lug 4 is slightly larger than the diameter of the pin, leaving a clearance as indicated at 20. A clearance 21, as shown in Figs. 1 and 5 is left between the periphery of the lug 4 and the member 1 while a clearance 22 is left between the periphery of the ears 3 and the member 2. Since the pin 5 fits tightly in the ears 3 and loosely in the lug 4 and there are clearances 21 and 22, as above described, it will be seen that there will be a slight rocking motion between the members 1 and 2 so as to allow the jaws 6 and 7 to grip and position the electrodes securely even though they may be uneven. This construction also compensates for the wearing of the jaws. Instead of the clearance hole 20 being straight all the way through the lug, I have found it to be advantageous in some cases, to use the construction shown in Fig. 6, in which the outer ends of the hole in the lug 4 are countersunk as at 23 thereby allowing more rocking motion than if the hole is straight all the way through the lug 4. The members 1 and 2 terminate in jaw portions 6 and 7. Either one or both of these jaws may be serrated, as at 8, in any suitable manner in order to provide a good gripping surface for the electrode. The inner surfaces of the members 1 and 2 have channels 9 therein. Seated within the channels 9 is a spring member 10 which is somewhat V-shaped. It will be noted that in the assembly of the members 1 and 2, the resilient member 10 is self alining within the channels 9; that is to say, all that is necessary to do is drop the spring into the channels 9 and it can take up any operative position that is chosen therein. In order to make the members 1 and 2 extra rigid, I prefer to provide each with ribs 11 and 12 extending substantially their full length. That part of the members 1 and 2 to the right of the pivot 5 serves as a handle portion of the tool and since this is operated by hand, I prefer to fit each of the members 1 and 2 with insulating strips 13 and 14 constructed of heat and blow resisting material. These strips may be fastened to the members 1 and 2 in any suitable manner, such as by screws 15, whose heads preferably pass below the outer periphery of the strips 13 and 14 and the holes filled with an insulating material 16, so that there will be no danger of the operator receiving a shock during the operation of the handle. The ends of the handle portions of the members 1 and 2 adjacent the insulating strips 13 and 14 are provided with receptacles 17 and 18 which are preferably arranged on the members 1 and 2 in staggered relation with each other, as shown in Fig. 4. This construction enables me to split the electrical current immediately adjacent the end of the welding tool and connect the two portions to the members 1 and 2 respectively, thereby dividing the current between the members 1 and 2 as well as to facilitate the operation of the members 1 and 2 about the pivot 5 for the insertion and removal of the electrode 19 or the unused portion thereof. This method of splitting the conductor and connecting it to the members 1 and 2 in the staggered relation shown serves also to eliminate or reduce the breaking of the strands of the conductor.

By utilizing the members 1 and 2 as current conducting parts, I have been enabled to produce a welding tool of a satisfactory size and weight, at the same time, I have eliminated any detrimental heating effects, due either to the current being carried through the members 1 and 2 or from the heat conveyed thereto through the arc or electrode or from a combination of both so that the welding tool can be operated continuously.

It will be understood by one skilled in the art that various changes may be made in the details without departing from the spirit of my invention or the scope of the appended claims.

Having thus described my invention, what I claim is:—

1. In a device of the class described, the combination of two metal members pivoted together intermediate their ends, means disposed between said members on one side of the pivot for forcing the members apart on this side and together on the other side of the pivot, said latter end of the members being constructed to grasp electrodes of different size with substantially the same opening of jaws, while the opposite end of the metal members is adapted to receive electrical conductors.

2. In a device of the class described the combination of two relatively heavy metal members pivotally mounted together intermediate their ends, a self alining spring extending longitudinally of and supported between said members on one side of the pivot for forcing the members apart on this side of the pivot and together on the other side of the pivot, whereby pressure is required to open the jaws, said latter end of the members being adapted to grasp an electrode while the opposite end of one or both of the members is adapted to receive electrical conductors.

3. In a device of the class described, the combination of two metal members pivoted together intermediate their ends, means disposed lengthwise between said members on one side of the pivot for forcing the members apart on this side and together on the other side of the pivot, said latter end of the members being adapted to grasp an electrode, said first mentioned end of the members having insulating strips fastened thereto to form an insulated handle and also having means for the attachment of electrical conductors.

4. A welding tool comprising two metal members pivotally mounted together intermediate their ends, said members having their ends on one side of the pivot adapted to grip an electrode and having longitudinal channels in their adjacent sides on the other side of the pivot, a V-shaped spring having its legs seated in said channels for operating the members to grip an electrode as described, and means for attaching electrical conductors to the ends of the metal members opposite to the electrode gripping end.

5. A welding tool comprising two metal members each having means for pivoting to the other and insulating strips fastened to similar ends thereof forming an insulating handle, said pivoting means consisting of ears on one member having a clearance between their periphery and the other member and a lug on the other fitting within said ears and having a clearance between its periphery and the other member and a pin passing through said ears making a tight fit therein and through said lug making a loose fit therein, means disposed between the metal members on that side of the pivot carrying the insulating strips to force the ends on the opposite side of the pivot to grasp an electrode and means for attaching electrical conductors to the handle end of said members.

6. A welding tool comprising two metal members each having a re-inforcing rib extending substantially their full length and having means for pivoting one to the other, channels in each member on sides opposite to said ribs, a self alining V-shaped spring seated in said channels for forcing the opposite ends of the pivot to grip an electrode, insulating strips fastened to each member forming an insulating handle and means on the ends of the members adjacent the outer ends of the insulating strips for attaching electrical conductors.

7. A welding tool comprising current carrying members pivoted together forming gripping jaws on one side of the pivot and a handle on the other side, insulating strips fastened to the handle side of the members forming a protecting handle, resilient means carried between the members for automatically forcing the gripping jaws to grip an electrode when placed therebetween, and means for attaching electrical conductors to the ends of said members adjacent the insulating strips.

8. A welding tool comprising current carrying members pivoted together in such a manner as to have rotary motion about said pivot and a rocking motion substantially at right angles to the rotary motion forming self adjusting electrode gripping jaws on one side of the pivot and a handle on the other side, insulating strips fastened to the handle side of the members forming a protecting handle, resilient means carried between the members for automatically forcing the gripping jaws to grip an electrode when placed therebetween, and means for attaching electrical conductors to the ends of said members adjacent the insulating strips.

In witness whereof I affix my signature.

JOHN J. CAMPBELL.